(No Model.)
A. G. FORSTER.
Child's Swing.
No. 235,758. Patented Dec. 21, 1880.
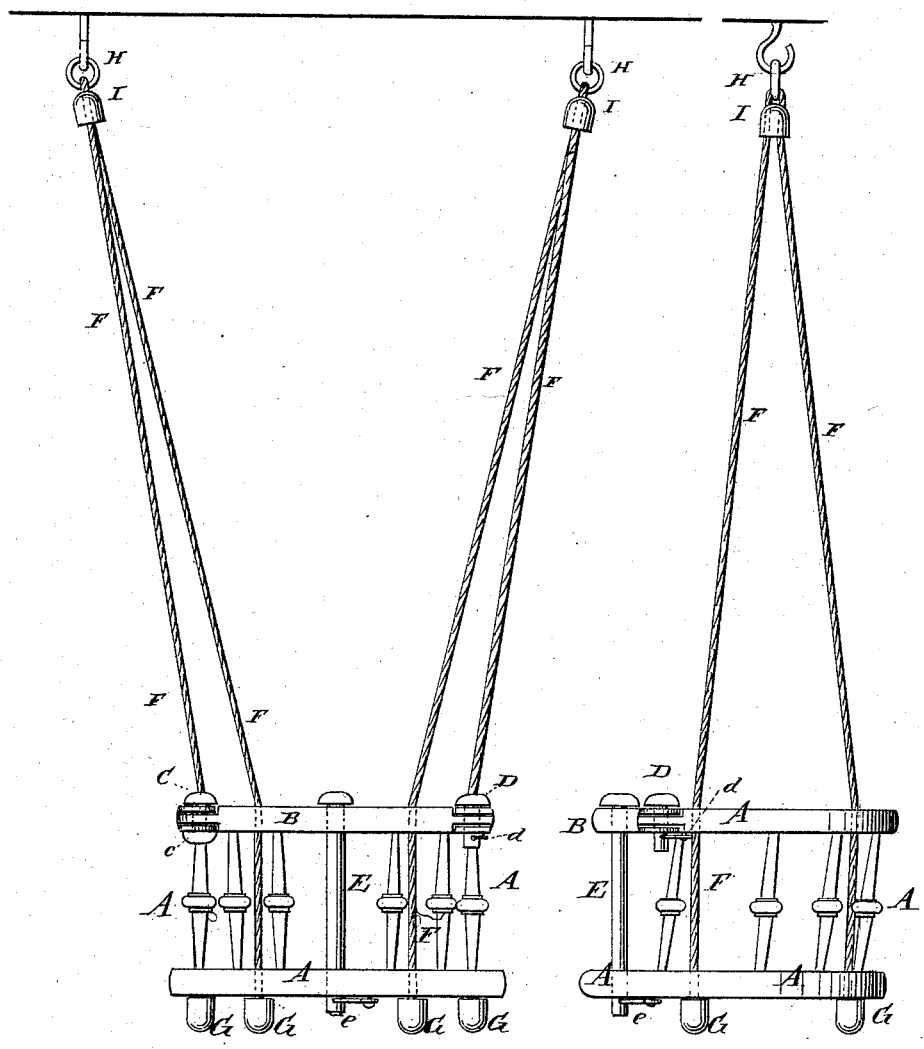
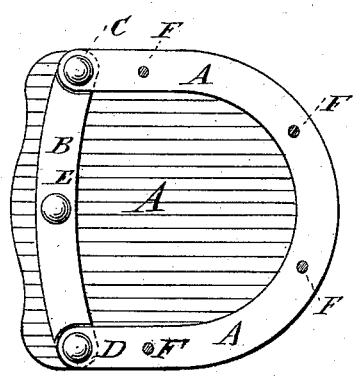
WITNESSES:
Chas. Nida
C. Sedgwick
INVENTOR:
A. G. Forster
BY Munn & Co
ATTORNEYS.

UNITED STATES PATENT OFFICE.

ALBERT G. FORSTER, OF NEW YORK, N. Y.

CHILD'S SWING.

SPECIFICATION forming part of Letters Patent No. 235,758, dated December 21, 1880.

Application filed April 21, 1880. (No model.)

*To all whom it may concern:*

Be it known that I, ALBERT G. FORSTER, of the city, county, and State of New York, have invented a new and useful Improvement in Children's Swings, of which the following is a specification.

Figure 1 is a front elevation of the improvement. Fig. 2 is a side elevation. Fig. 3 is a plan view.

Similar letters of reference indicate corresponding parts.

The object of this invention is to furnish swings for children, so constructed that the children cannot slide out of them while being swung, and can be put into them very easily and quickly.

A represents the seat, which is made like the seat of an ordinary child's chair. In the ends of the arms of the seat A are formed horizontal slots to receive tenons formed upon the ends of the bar B, where they are secured in place by wooden pins C D. The pin C has a collar, c, attached to its lower end, to keep it in place, so that it may serve as a hinge-pivot to the bar B. The forward end of the pin D has one or more holes formed in it to receive a hook, d, to prevent the said pin D from being drawn out by the child.

E is a pin which is passed down through a hole in the center of the bar B and in the center of the forward part of the seat board or frame, and has one or more holes formed in its lower end to receive a hook, e, to prevent the said pin E from being drawn out by the child. The pin E is passed down between the child's legs after he has been placed in the seat and the cross-bar B has been secured in place. With this construction the bar B and the pin E are rigid and keep the child firmly and securely in place, and at the same time are easily and conveniently secured and released, so that the child can be very quickly put in and taken out.

The swing-seat A is supported by two ropes, F, the ends of which are passed through holes in the arms and bottom board or frame of the seat, and have wooden knobs G attached to their ends, which knobs have their upper sides flattened, so that they may rest squarely against the seat board or frame. Upon the middle parts of the ropes F are placed metal rings H, to receive the hooks that support the swing, and which are kept in place by wooden knobs I, through which the loops of the ropes F are passed.

I am aware that straps have been used to secure a child in a swing-seat; but they are objectionable from the fact that they are flexible and do not keep the child firmly in the seat, but allow him to slip forward and hang upon the said straps. This construction I do not claim; but,

Having thus described my invention, I claim as new and desire to secure by Letters Patent—

1. The combination, with the seat A, having horizontal slots in the ends of its arms, of the end-tenoned bar B, the wooden pin C, having collar c, the wooden pin D, having a hook, d, in a hole thereof, and the median pin, E, as shown and described.

2. The combination, with the seat A, of the knobs G G, the doubled rope F, having eye H at its bend, and the sliding knob I, for the purpose specified.

ALBERT G. FORSTER.

Witnesses:
JAMES T. GRAHAM,
C. SEDGWICK.